(12) United States Patent
Uotila et al.

(10) Patent No.: US 10,150,578 B2
(45) Date of Patent: Dec. 11, 2018

(54) LIGHTING APPARATUS OF A HELICOPTER DECK

(71) Applicant: Frictape Net Oy, Klaukkala (FI)

(72) Inventors: Jaakko Uotila, Lepsämä (FI); Marko Törrönen, Klaukkala (FI)

(73) Assignee: FRICTAPE NET OY, Klaukkla (FI)

(*) Notice: Subject to any disclaimer, the term of this patent is extended or adjusted under 35 U.S.C. 154(b) by 0 days.

(21) Appl. No.: 15/569,699

(22) PCT Filed: Apr. 20, 2016

(86) PCT No.: PCT/FI2016/050259
§ 371 (c)(1),
(2) Date: Oct. 26, 2017

(87) PCT Pub. No.: WO2016/174304
PCT Pub. Date: Nov. 3, 2016

(65) Prior Publication Data
US 2018/0127112 A1      May 10, 2018

(30) Foreign Application Priority Data

Apr. 28, 2015   (FI) .................................... 20155311

(51) Int. Cl.
*B64F 1/20*      (2006.01)
*E01F 3/00*     (2006.01)
(Continued)

(52) U.S. Cl.
CPC ............... *B64F 1/20* (2013.01); *E01F 3/00* (2013.01); *F21S 8/032* (2013.01); *B64D 2203/00* (2013.01); *F21W 2111/06* (2013.01)

(58) Field of Classification Search
CPC .... B64F 1/20; B64F 1/007; B64F 1/18; F21S 8/032; E01F 3/00; B64D 2203/00; F21W 2111/06
See application file for complete search history.

(56) References Cited

U.S. PATENT DOCUMENTS

| | | | |
|---|---|---|---|
| 5,351,915 A | * | 10/1994 | Aandalen .................. E01F 3/00 244/114 R |
| 5,559,510 A | | 9/1996 | Strong, III et al. |

(Continued)

FOREIGN PATENT DOCUMENTS

| | | |
|---|---|---|
| CN | 203514150 U | 4/2014 |
| KR | 20150030964 A | 3/2015 |
| WO | 2015056200 A1 | 4/2015 |

OTHER PUBLICATIONS

International Search Report of PCT/FI2016/050259, dated Jul. 29, 2016.
Written Opinion of PCT/FI2016/050259, dated Jul. 29, 2016.

*Primary Examiner* — Ryan Sherwin
(74) *Attorney, Agent, or Firm* — Venable LLP; Jeffri A. Kaminski

(57) ABSTRACT

The disclosure relates to a lighting apparatus of a helicopter deck, which is meant especially while being installed in connection with an identification marking, such as an H, triangle, cross figure or the like, and/or a touchdown and positioning mark ring on a landing and takeoff area of the helicopter deck for illuminating the safety marking/markings in question in order to make more efficient observing thereof from the air. The lighting apparatus includes of light units formed of one or more lamps and being operable by power supply transmitted from a power source in connection with the helicopter deck, wherein the light units are coupled essentially immovably in connection with an upper surface of the helicopter deck. Light units of the lighting apparatus are coupled in connection with the upper surface of the helicopter deck by means of a horizontal fastening arrangement in order to keep the light units in place by means of fastening means, being in connection therewith in a manner transmitting power essentially in a direction parallel with a plane of the helicopter deck.

5 Claims, 7 Drawing Sheets

(51) Int. Cl.
*F21S 8/00* (2006.01)
*F21W 111/06* (2006.01)

(56) References Cited

U.S. PATENT DOCUMENTS

| | | | | |
|---|---|---|---|---|
| 5,577,687 | A * | 11/1996 | Downing | B64F 1/007 |
| | | | | 244/110 E |
| 5,986,792 | A * | 11/1999 | Rizkin | B64F 1/20 |
| | | | | 359/212.1 |
| 6,193,190 | B1 * | 2/2001 | Nance | B64F 1/007 |
| | | | | 244/114 R |
| 6,197,137 | B1 * | 3/2001 | Akahani | B63B 59/045 |
| | | | | 114/222 |
| 9,187,186 | B2 * | 11/2015 | Besenzoni | B63B 3/48 |
| 2011/0290509 | A1 * | 12/2011 | Uppal | A62C 3/00 |
| | | | | 169/54 |
| 2015/0022379 | A1 * | 1/2015 | Lewis | B64F 1/20 |
| | | | | 340/946 |
| 2016/0251089 | A1 * | 9/2016 | Bertin | B64F 1/20 |
| | | | | 362/153.1 |

* cited by examiner

LIGHTING APPARATUS OF A HELICOPTER DECK

CROSS-REFERENCES TO RELATED APPLICATIONS

This application is a U.S. National Stage application of PCT/FI2016/050259, filed 20 Apr. 2016 and published on 3 Nov. 2016 as WO 2016/174304, which claims the benefit of Finnish Patent Application No. 20155311, filed 28 Apr. 2015, all of which are hereby incorporated by reference in their entireties.

The invention relates to a lighting apparatus of a helicopter deck according to the preamble of the independent claim directed thereto.

Figure 1:
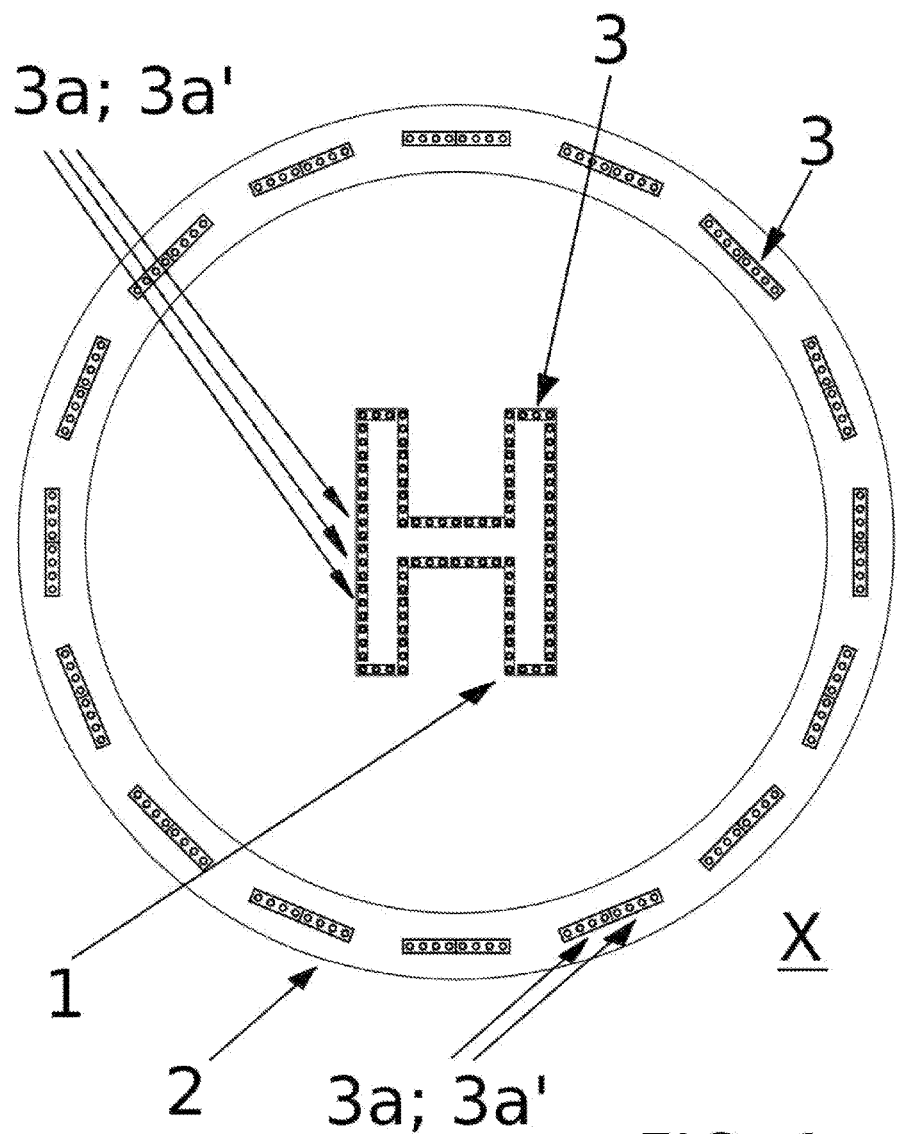

Helicopter decks especially in offshore use are equipped with an identification marking, such as an H, triangle, cross figure or the like, on a landing and takeoff area thereof and a touchdown and positioning mark ring surrounding the identification marking. These markings, according to today's regulations, need to be illuminated in order to make more efficient observing thereof from the air. For this reason, first of all, light units surrounding the identification marking and on the other hand the light units arranged on a circle in the middle of the touchdown and positioning mark ring are coupled according to today's practice, as shown in FIGS. 1 and 3b, with screw joints to the helicopter deck, wherein the light units typically consist of a combination of several light producing lamps.

Figure 2A:
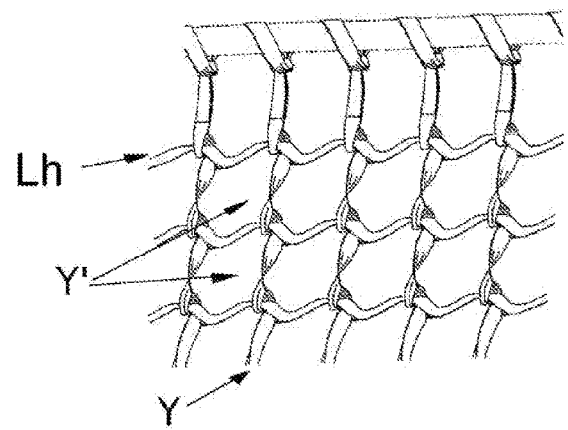
Figure 2B:
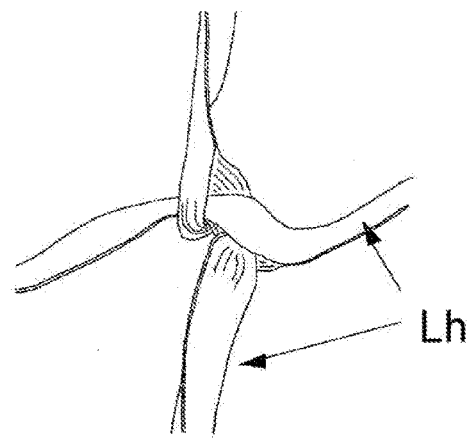
Figure 2C:
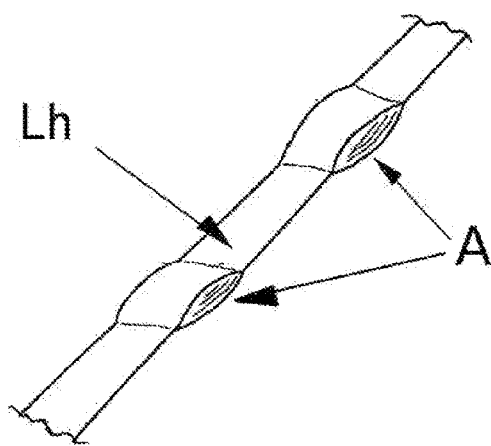
Figure 2D:
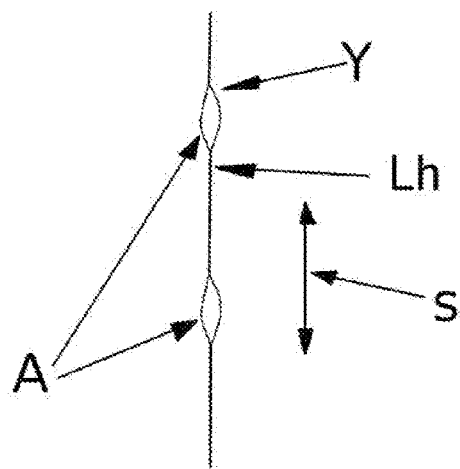

A helicopter deck in the abovementioned use has to be equipped additionally with a friction net that covers at least the landing and takeoff area, in which connection, especially with reference to FIGS. 2a-2d, the friction net consists advantageously of a flat band that is woven at least partly from synthetic material and that has, according to FIGS. 2c and 2d, lead-through openings at a constant distance from each other in longitudinal direction, the openings going in crosswise direction through the layers on top of each other of the flat band, wherein the friction net can be put together from the flat band in a way that it has an essentially constant measured eye size as shown in FIGS. 2a and 2b.

The most important advantage of the flat band described above is that it, thanks to being manufactured partly from synthetic material, keeps its shape and dimensions enabling thus even a very long term continuous usage also in terms of safety regulations, as the eye size remains constant, because the knot points of the friction net stay on their place stationarily despite strains directed to the friction net.

For the part of lighting apparatuses utilized in the kind of operational purposes described above, e.g. arduousness of assembly and maintenance of the light units illuminating the safety markings mentioned above of a helicopter deck is, however, proven problematic, because, in order to ensure reliable staying in place of the safety markings, they have to be fastened with a very large amount of screws. Additionally, because the light units protrude from the upper surface of the helicopter deck, the stems of the screws used in fastening of the same are subject to constant rubbing and wear, which is why the screw stems may partly suffer from change of shape, wherein removing the screws e.g. while repairing or changing the light units may require removal of the screws by drilling.

Therefore, the technique related to the lighting apparatuses being used in connection with helicopter decks is not at present at a satisfactory level especially from the point of view of assembly, or service and maintenance for that matter.

It is an aim of the lighting apparatus of a helicopter deck according to the present invention to bring about a decisive improvement particularly in the problems described above and thus to raise essentially the level of prior art. In order to carry out this aim, the lighting apparatus of a helicopter deck according to the invention is mainly characterized by what has been presented in the characterizing part of the independent claim directed thereto.

As the most important advantages of the lighting apparatus of a helicopter deck according to the invention may be mentioned simplicity of the stock of equipment applicable to the same as well as both installation and service and maintenance thereof in relation to the arrangements in use today, which is thanks to making possible fastening of the light units of the lighting apparatus in connection with an upper surface of a helicopter deck with a horizontal fastening arrangement instead of a vertical screw coupling. Thus, the light units may be assembled and kept in place in by means of fastening means, that are in a power transmitting connection therewith essentially in a direction aligned with the plane of the helicopter deck, without a need for the fastening of each light unit individually to the helicopter deck with multiple screws.

Thanks to the simple fastening principle of the lighting apparatuses' light units it is possible to reduce the amount of installation, service and maintenance measures to a fraction of the measures needed at present, in addition to which, problems related typically to a traditional screw coupling, such as the screws getting jammed, screw stems getting worn out and, what is the most important, the huge amount of work and time consuming fastening of the light units with screws to the helicopter deck, may be avoided.

The light units of the lighting apparatus according to the invention may furthermore be fastened in a very simple and fast manner both to surround the identification marking and at the center of the touchdown and position mark ring by fastening the light units to auxiliary frame arrangements of a suitable shape, which for their part are coupled to stay in place by means of fastening means transmitting at least pulling, such as cables, and that are supported at the outer edges of the helicopter deck.

On the other hand, the invention enables fastening of the light units of the lighting apparatus by means of a friction net being used on the helicopter deck, so that the light units are fastened with mechanical coupling means in connection with the friction net. In this connection, it is as an advantageous embodiment, especially when using a friction net with an essentially standard eye size friction net as described in the beginning, possible to couple the light units as one or more groups in one or more successively, adjacently and/or diagonally with respect to each other existing eyes of the net, wherein the lighting apparatus does not in practice require any separate fastening arrangements on to the helicopter deck.

Other advantageous embodiments of the lighting apparatus of a helicopter deck according to the invention have been presented in the dependent claims directed thereto.

Figure 3A:
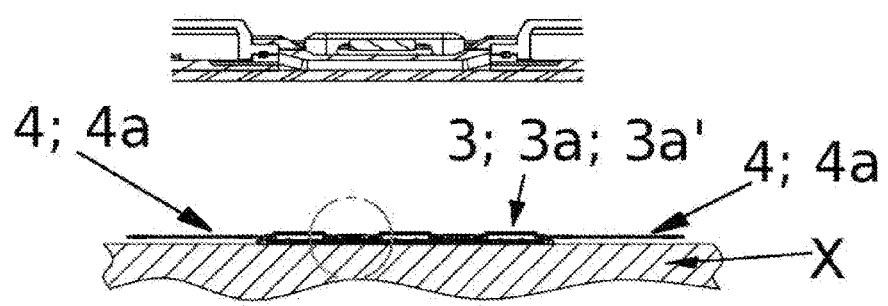
Figure 3B:
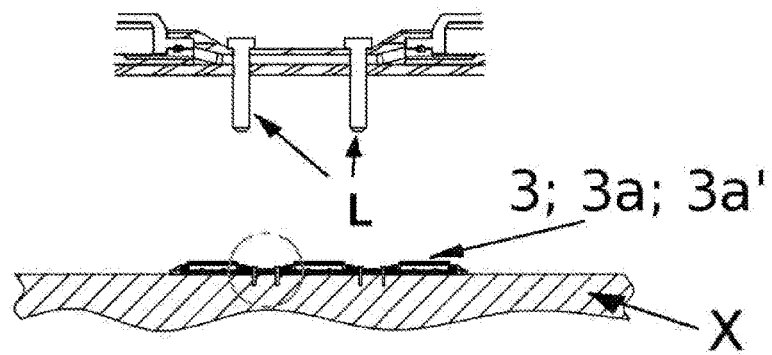
Figure 4:
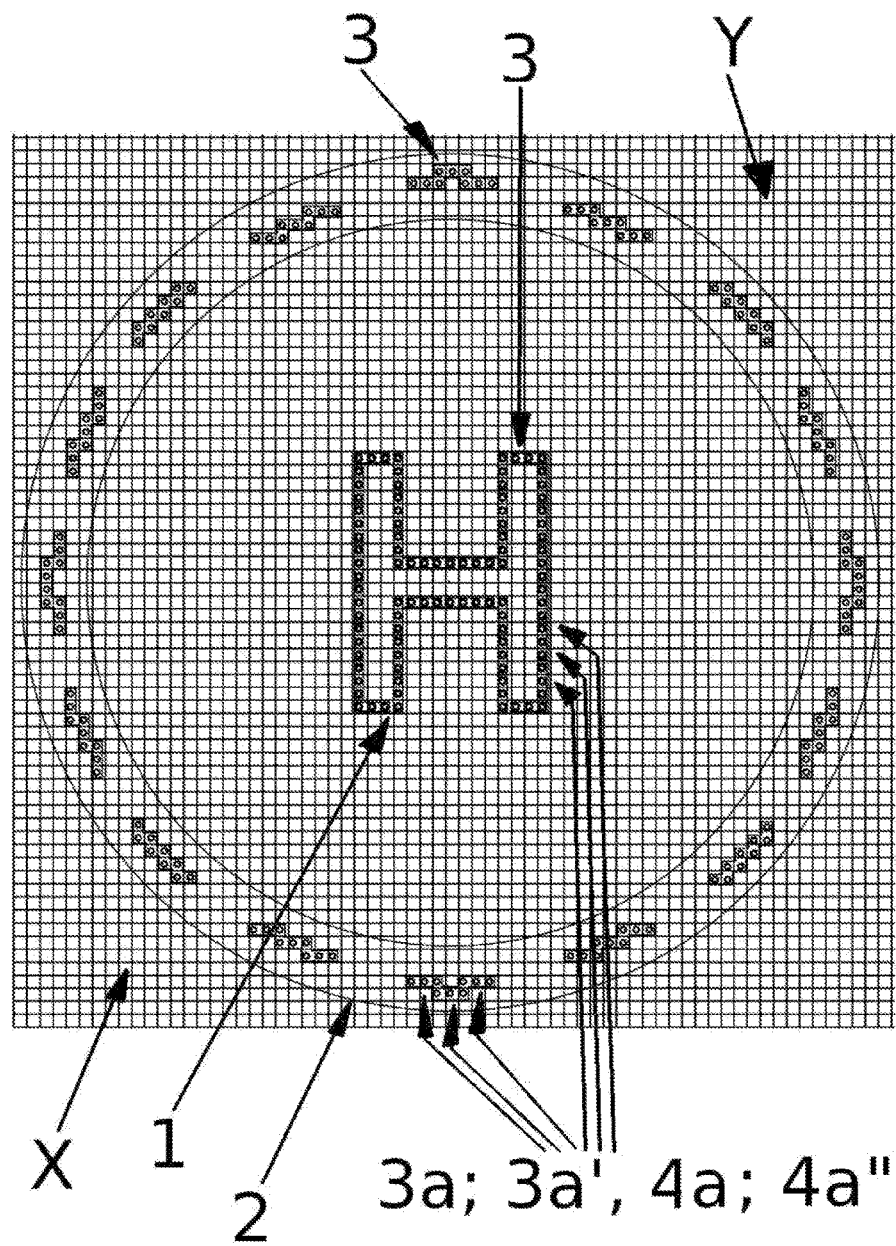
Figure 5:
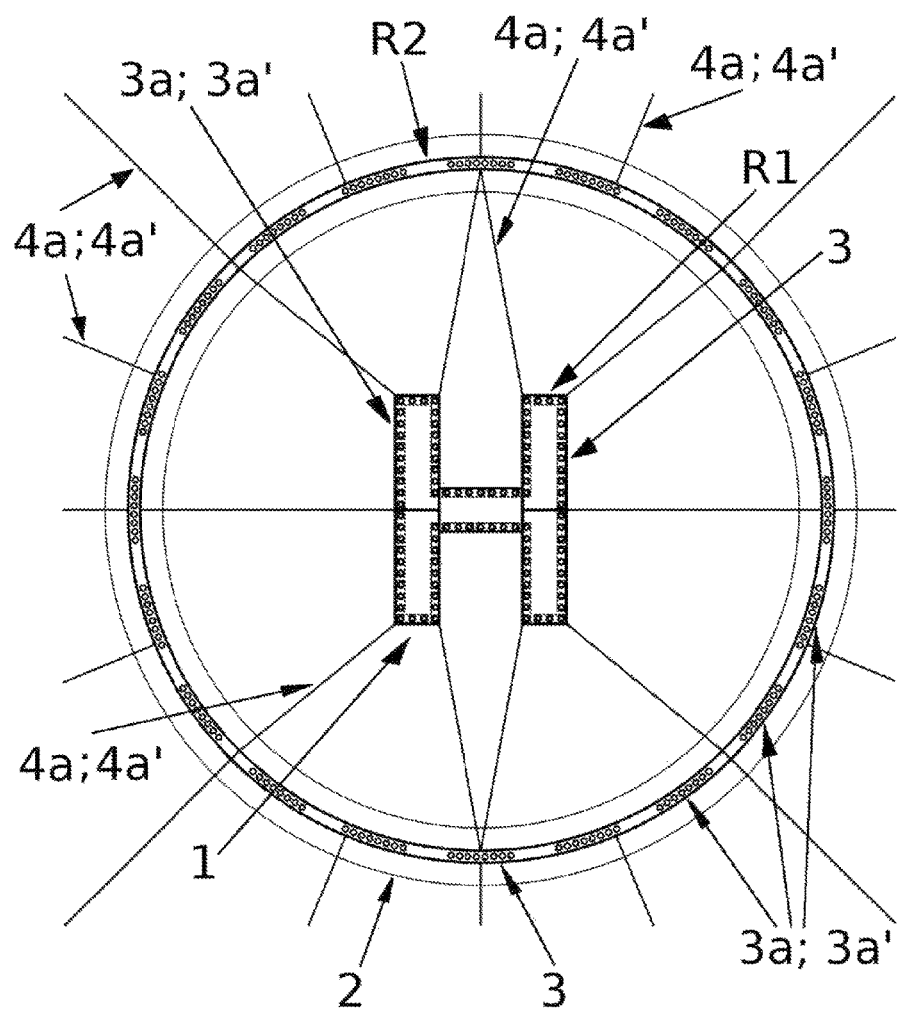
Figure 6:
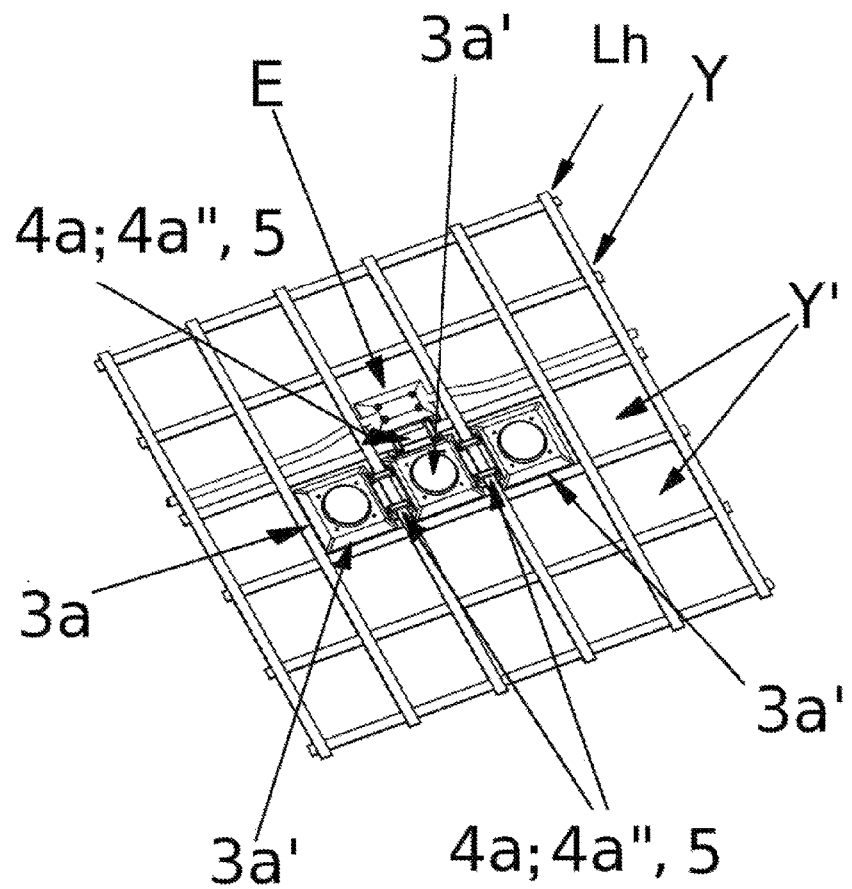

In the following description the invention is being illustrated in detail with reference to the appended drawings, in which in FIG. 1
is shown as a view from above a lighting apparatus according to prior art in connection with safety markings of a helicopter deck, in FIGS. 2a-2d
are shown a side view of an especially advantageous friction net according to prior art, a detail from a knot point of such a friction net, a perspective view of a flat band used in the friction net and a side view of the flat band, in FIGS. 3a, 3b are shown as a cross section view and as an enlarged detail of the fastening of a light unit of the lighting apparatus according to the invention in place in connection with a helicopter deck, and respective views of the fastening in place of a light unit of a lighting apparatus according to prior art, in FIG. 4 is shown as a view from above an advantageous lighting apparatus according to the invention that is to be fastened in place by means of a friction net, in FIG. 5 is shown as a view from above another embodiment that is to be implemented with auxiliary frame arrangements to be supported in connection with the safety markings, and in FIG. 6 is shown as a perspective view from above of one further advantageous embodiment to be used in connection with a friction net.

The invention relates to a lighting apparatus of a helicopter deck, which is meant especially while being installed in connection with an identification marking 1, such as an H, triangle, cross figure or the like, and/or a touchdown and positioning mark ring 2 on a landing and takeoff area of the helicopter deck X for illuminating the safety marking/markings in question in order to make more efficient observing thereof from the air. The lighting apparatus 3 consists of light units 3a formed of one or more lamps 3a' and being operable by power supply transmitted from a power source in connection with the helicopter deck, wherein the light units are coupled essentially immovably in connection with an upper surface of the helicopter deck X. The light units 3a of the lighting apparatus 3 are coupled in connection with the upper surface of the helicopter deck X with respect to the advantageous embodiments shown in FIGS. 4 and 5 by means of a horizontal fastening arrangement 4 in order to keep the light units in place by means of fastening means 4a, being in connection therewith in a manner transmitting power essentially in a direction parallel with a plane of the helicopter deck and being supported at outer edges of the helicopter deck.

In FIG. 3a is shown the above mentioned coupling principle of a light unit 3; 3a of a lighting apparatus according to the invention both as a cross section from the side and as an enlarged detail. In FIG. 3b, for its part, has been shown respective views of the fastening of a lighting apparatus according to prior art, which is implemented with screw couplings L onto top surface of the helicopter deck. Thanks to the horizontal fastening arrangement 4; 4a according to the invention, it is therefore possible to significantly ease assembly, service and maintenance of the light units 3; 3a, because vertical screw coupling L to the helicopter deck with multiple screws can be avoided.

Especially with reference to the advantageous embodiment according to the invention shown in FIG. 5, it comprises light units 3a surrounding the identification marking 1. The light units 3a are coupled by means of fastening means 4a; 4a' transmitting at least pulling, such as cable wires, with an auxiliary frame arrangement R1 that is kept in place on the helicopter deck X in connection with the identification marking 1 in a manner supported at the outer edges of the helicopter deck.

In this context, as a furthermore advantageous embodiment, the light units 3a being arranged as a circle at the center of the touchdown and positioning mark ring 2, are coupled by fastening means 4a; 4a' transmitting at least pulling, such as a cable wire, with an auxiliary frame arrangement R2 that is kept in place on the helicopter deck in connection with the touchdown and positioning mark ring 2 in a manner supported at the outer edges of the helicopter deck.

As a furthermore advantageous embodiment of a lighting apparatus according to FIG. 5, in connection with the auxiliary frames R1/R2 connecting the light units 3a of the lighting apparatus 3 are arranged electric wiring assemblies for power supply of the light units 3a.

As a furthermore advantageous embodiment of a lighting apparatus according to the invention especially with reference to FIG. 4, the lighting apparatus 3 comprises light units 3a surrounding the identification marking 1 and/or light units 3a being arranged as a circle at the center of the touchdown and positioning mark ring 2, in addition to which the helicopter deck X is provided with a friction net Y that covers at least the landing and takeoff area, that is at least partly made of synthetic material in order to enable keeping its shape and dimensions and that is supported at outer edges of the helicopter deck. Thus, in the embodiment to be used in this context, the light units 3a of the lighting apparatus 3 are coupled by mechanical fastening means 4a; 4a" in connection with the friction net Y.

In this context, as a furthermore advantageous embodiment, the friction net Y comprises most advantageously a woven flat band Lh shown in FIGS. 2a-2d, which has lead-through openings A at a constant distance from each other in longitudinal direction s and going in crosswise direction through the layers on top of each other of the flat band, in which case the friction net Y being put together from the flat band has an essentially constant measured eye size. Thus, in the embodiment to be used in this case, the light units 3a of the lighting apparatus 3 are coupled on the principle as shown in FIGS. 4 and 6 within one or more successively, adjacently and/or diagonally with respect to each other existing eyes Y' of the friction net Y.

In this context, as a furthermore advantageous embodiment, lamps 3a' of the lighting apparatus 3 to be coupled within successive, adjacent and/or diagonally with respect to each other existing eyes Y' of the friction net Y are arranged as a structurally uniform light unit 3a by means of a coupling arrangement 5 connecting the same mechanically, which especially in the advantageous embodiment shown in FIG. 6 comprises in the same context also mechanical fastening means 4a; 4a" for coupling thereof with the friction net. The coupling arrangement 5 and the fastening means 4a; 4a" are executed e.g. with fastening parts existing above and below the flat band of the friction net and tightened to each other e.g. by a screw joint.

As a further advantageous embodiment of the lighting apparatus according to the invention with reference to FIGS. 4 and 6, the light unit 3a to be used in the net eyes Y' of the friction net Y, having preferably a size of eyes approximately 200 mm×200 mm, consists of at least two lamps 3a' coupled with each other structurally with each other coupled and operable by means of a common power supply E.

The one or more lamps 3a' being used in the light units of the lighting apparatus according to the invention are most advantageously composed by using e.g. LED or electroluminescence lamps, in which context it is, however, also possible to utilize some another technique suitable to the use in question, such as e.g. lamps based on laser, OLED, LEC-quantum points, plasma, halogen and induction bulbs or the like.

It is clear that the invention is not limited to the embodiments shown or described above, but it can be modified in very many ways within the basic idea of the invention e.g. depending on the use and circumstances of use at each time. Thus, it is naturally possible e.g. to combine in the same lighting apparatus both couplings of the light units with an auxiliary frame and with a friction net etc. Especially in the supporting in place of the auxiliary frames, it is possible to utilize e.g. rigid poles instead of cable wires that only transmit pulling, wherein there is, however, a risk of change of shape being caused thereto in use, which is why keeping the auxiliary frames in place on the helicopter deck may demand more service and maintenance measures when compared to wire cable coupling. Respectively, the power supply arrangements may be executed depending on the circumstances at any given time totally or partly with electricity conductor arrangements existing above and/or being led through the helicopter deck etc.

The invention claimed is:

1. Lighting apparatus of a helicopter deck, being installed in connection with an identification marking, on a landing and takeoff area of the helicopter deck for illuminating the safety marking/markings in question in order to make more efficient observing thereof from the air, wherein the lighting apparatus comprises light units formed of one or more lamps and being operable by power supply transmitted from a power source in connection with the helicopter deck, wherein the light units are coupled essentially immovably in connection with an upper surface of the helicopter deck wherein, the light units of the lighting apparatus are coupled in connection with the upper surface of the helicopter deck by means of a horizontal fastening arrangement in order to keep the light units in place by means of fastening means, being in connection therewith in a manner transmitting power essentially in a direction parallel with a plane of the helicopter deck and being supported at outer edges of the helicopter deck, the lighting apparatus comprises light units surrounding the identification marking when the lighting apparatus is installed in connection with the identification marking and light units being arranged as a circle at the center of the touchdown and positioning mark ring when the lighting apparatus is installed in connection with the touchdown and positioning mark ring, and, wherein the helicopter deck is provided with a friction net that covers at least the landing and takeoff area, that is at least partly made of synthetic material in order to enable keeping its shape and dimensions and that is supported at outer edges of the helicopter deck, wherein, the light units of the lighting apparatus are coupled by mechanical fastening means in connection with the friction net.

2. Lighting apparatus according to claim 1, wherein, the light units of the lighting apparatus are coupled within one or more successively, adjacently and/or diagonally with respect to each other existing eyes of the net.

3. Lighting apparatus according to claim 1 wherein, at least two of the lamps are coupled within successively, adjacently and/or diagonally with respect to each other, existing eyes of the friction net are arranged as a structurally uniform light unit by means of a coupling arrangement connecting the eyes mechanically.

4. Lighting apparatus according to claim 1, wherein, the light unit in net eyes of the friction net, having a size of eyes ~200 mm×200 mm, comprises one or several lamps coupled with other lamps structurally and/or electrically and are operable by means of a common power supply.

5. Lighting apparatus according to claim 1, wherein, the supporting in place of the light units is arranged by means of the friction net, which comprises a woven flat band, which has lead-through openings at a constant distance from other lead-through openings in a longitudinal direction and going in a crosswise direction through the layers on top of each other of the flat band, wherein the friction net has an essentially constant measured eye size.

* * * * *